United States Patent [19]

Brooks et al.

[11] Patent Number: 5,675,411
[45] Date of Patent: Oct. 7, 1997

[54] BROAD-BAND SPECTROMETER WITH HIGH RESOLUTION

[75] Inventors: Neil H. Brooks, San Diego, Calif.; Sergey N. Tugarinov, Troitsk; Nicolae N. Naumenko, Minsk, both of Russian Federation

[73] Assignee: General Atomics, San Diego, Calif.

[21] Appl. No.: 647,623

[22] Filed: May 10, 1996

[51] Int. Cl.$^6$ ............................ G01J 3/20; G01J 3/02
[52] U.S. Cl. .................................................. 356/328
[58] Field of Search ............................ 356/300, 305, 356/326, 328

[56] References Cited

U.S. PATENT DOCUMENTS

| | | | |
|---|---|---|---|
| 3,922,089 | 11/1975 | Danielsson et al. | 356/300 |
| 4,087,183 | 5/1978 | Passereau | 356/305 |
| 4,191,474 | 3/1980 | Passereau | 356/305 |
| 4,380,393 | 4/1983 | Nagata et al. | 356/328 |
| 4,673,292 | 6/1987 | Pouey | 356/334 |
| 4,678,332 | 7/1987 | Rock et al. | 356/328 |
| 4,684,253 | 8/1987 | Lindblom et al. | 356/333 |
| 4,752,130 | 6/1988 | George et al. | 356/334 |
| 4,815,849 | 3/1989 | Sullivan | 356/328 |
| 4,834,474 | 5/1989 | George et al. | 359/8 |
| 5,066,127 | 11/1991 | Schwenker | 356/328 |
| 5,139,335 | 8/1992 | Lundeen et al. | 356/328 |

FOREIGN PATENT DOCUMENTS

| | | | |
|---|---|---|---|
| 61-120023 | 6/1986 | Japan | 356/328 |
| WO95/31703 | 11/1995 | WIPO | |

OTHER PUBLICATIONS

Lerner, et al., "Flat field imaging spectroscopy using aberration corrected holographic gratings", *Proceedings of SPIE—The International Society for Optical Engineering*, 268, Los Angeles, CA (Feb. 10-11 1981).

Primary Examiner—F. L. Evans
Attorney, Agent, or Firm—Fitch, Even, Tabin & Flannery

[57] ABSTRACT

A spectrometer provides a substantially simultaneous electronic output over a broad spectral range while maintaining a relatively high resolution. The spectrometer uses a fiber-optic transformer having an arcuate one-dimensional input region, associated with the image plane of a Rowland circle, and produces a rectangular two-dimensional output image, for illuminating the active area of a two-dimensional CCD sensor.

20 Claims, 3 Drawing Sheets

BROAD-BAND SPECTROMETER WITH HIGH RESOLUTION

BACKGROUND OF THE INVENTION

The present invention relates to optical spectroscopy measurement instruments, and more particularly to a spectrometer that covers a broad wavelength spectrum with high resolution.

A typical spectrometer resolves incoming light, by angularly spreading the light's spectral components in a plane using a diffraction grating, and measures the intensity of the resolved spectral components using a linear electro-optical sensor array. The linear sensor is oriented a fixed distance from the grating with the array elements lying in the spreading plane such that each array element corresponds to a particular spectral component. For a particular linear sensor array having a fixed length and element density, increasing the linear spectral spreading on the sensor array increases the spectrometer's spectral resolution and decreases its spectral range. Conversely, decreasing the linear spectral spreading on the sensor array and the grating decreases the spectrometer's spectral resolution and increases its spectral range.

Manufacturing limitations and similar considerations provide a practical limit to the length and element density of cost-effective linear sensor arrays. Accordingly, high-resolution spectral measurements over a broad spectral band are generally performed using a spectrograph, which uses a long strip of photographic film to record the incoming light's spectral components. However, photographic film transport and processing considerations limit the number and frequency of the spectrograph's spectral measurements. Further, measurements recorded on photographic film are not directly adapted for use with current electronic data processing and storage techniques.

Accordingly, there is a need for a broad-band spectrometer with high resolution that has an electronic interface for readily providing the spectral measurements to electronic data processing equipment. The present invention satisfies this need.

SUMMARY OF THE INVENTION

The present invention is embodied in a spectrometer that provides an electrical signal representing an optical signal's spectral components. The spectrometer includes an optical instrument based on a Rowland circle spectrograph, an optical transformer and an electro-optical sensor.

The optical instrument spectrally disperses the optical signal, substantially in a dispersion plane, such that the signal's spectral components are projected onto a circularly curved image plane. The curved image plane is oriented perpendicular to the dispersion plane. The spectral components are imaged along an arc of a curved image plane. The arc generally lies in the dispersion plane. The optical transformer has an arcuate input surface aligned with the arc and a substantially flat rectangular output surface. The transformer divides the input surface into a plurality of discrete segments along the arc and optically transforms the segments into a stacked format to form a rectangular image area of stacked segments. The transformer further maps the curved input surface with the rectangular output surface so that light incident upon a location of the arcuate input surface is emitted from a corresponding location of the rectangular output surface.

The electro-optical sensor, responsive to light emitted from the rectangular output surface, provides an electrical signal that represents the intensity and position of light emitted from the output surface of the optical transformer.

In more detailed features of the invention, the arcuate input surface has a height of about 0.65 millimeters and a length of about 140 millimeters and the rectangular output surface has a height of about 13 millimeters and width of about 6.7 millimeters. Further, the length of the arcuate input surface is divided into 20 substantially equal segments. The top 0.65 millimeters of the rectangular output surface correspond to the segment at one end of the arcuate input surface and the bottom 0.65 millimeters of the rectangular output surface correspond to the segment at the other end of the arcuate input surface.

In other more detailed features of the invention, the optical transformer comprises a plurality of light conduits, each associated with one of the discrete segments. Further, each conduit comprises a plurality of optical fibers epoxied together at their ends and oriented such that the relative position of light incident on the input surface, within a segment, is preserved when that light is emitted from the corresponding segment of the output surface.

In another embodiment of the present invention, the spectrometer includes an entrance slit, a diffraction grating that resolves the optical signal onto an arc of a circle, an optical-transformer, and an electro-optical sensor. The optical transformer takes the resolved light incident on discrete segments of the arc and spatially redistributes it so that the resolved light emitted by the transformer is in a stacked rectangular format. The electro-optical sensor is responsive to the light emitted by the transformer, and provides an electrical signal that represents the intensity and position of the light emitted from the transformer.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
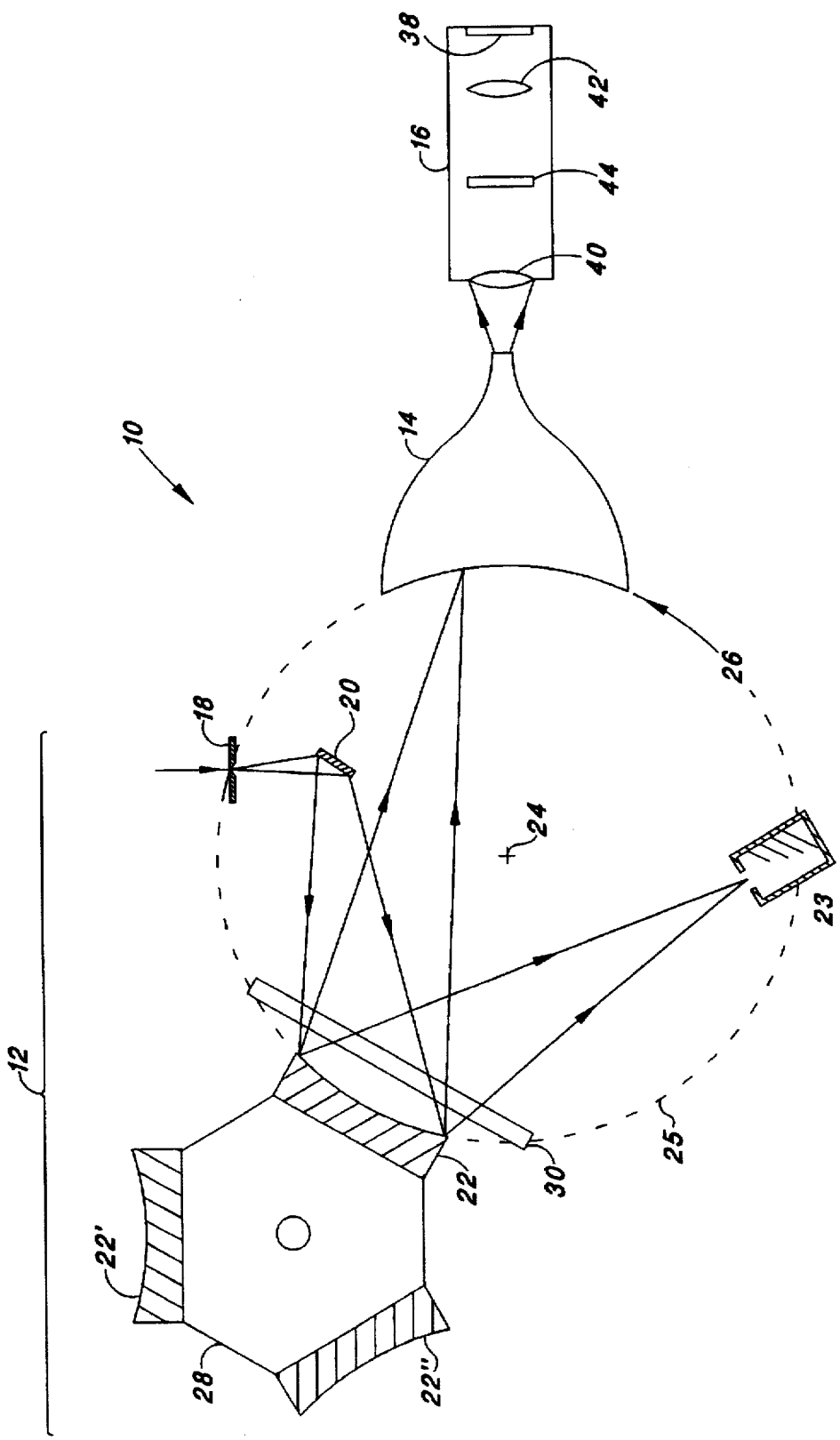
FIG. 1 is a top schematic view of a spectrometer including a fiber-optic transformer, in accordance with the present invention.

As shown in the exemplary drawings, and particularly in FIG. 1, the present invention is embodied in a high-resolution spectrometer 10 that provides an electrical signal representing an optical signal's spectral components over a broad spectral range. The spectrometer includes an optical instrument 12, a fiber-optic transformer 14, and an electro-optical sensor 16.

The optical instrument 12 is based on a survey spectrograph which uses a Rowland circle design to provide a high optical throughput and a significant improvement in optical performance over a flat-field spectrometer. Light enters the optical instrument through an entrance slit 18 and is deflected by a planar mirror 20 toward a concave diffraction grating 22. The slit's width is adjustable from 10 microns and 1 millimeter. The slit's vertical height is 10 millimeters. Scattered light inside the instrument is minimized with a light trap 23 for the zero-order reflection from the grating.

The grating 22 is an aberration-corrected holographic diffraction grating having a concave reflective surface with a curvature radius of 25 centimeters and a full aperture diameter of 7 centimeters. The grating is oriented along the perimeter of a circle 25 (shown in FIG. 1 with a dashed line) with a center point 24 and a diameter of 12.7 centimeters. The grating resolves the incoming light into its spectral components by angularly diffracting the light, by wavelength, in a dispersion plane. The aberration corrected holographic grating, configured for use with the Rowland circle optical mount, yields, in a curved image plane 26 along the circle's perimeter, the special properties of stigmatic imaging and high resolution with large aperture.

Several grating densities can be readily selected using a turret 28 having several gratings of differing grating densities mounted on it. Preferably, the density of a first grating 22 is 1200 gratings per millimeter (g/mm), a second grating 22' is 1800 g/mm, and a third grating 22" is 2400 g/mm. Thus, the ruling density of the grating can be changed merely by rotating the turret until the desired grating is in the correct position.

The grating's aperture may be masked, as required, in the vertical direction using horizontal mask 30 to improve the instrument's vertical resolution. An achievable vertical resolution with a grating aperture of 40 millimeters in the verticle direction, for example, is 0.1 millimeters. The optical instrument is stigmatic, has an f/number of 3 (without the mask 30), and can achieve a spectral resolution of 0.1–0.05 nanometers.

Figure 2:
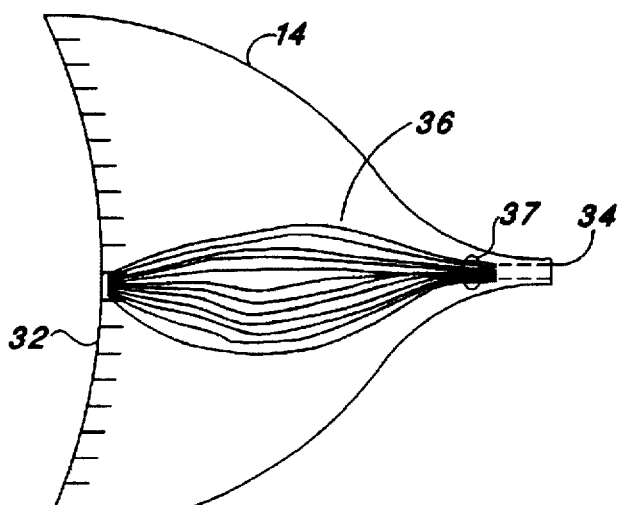
FIG. 2 is a top plan view of the fiber-optic transformer of FIG. 1, showing the transformer's arcuate input surface and flat output surface.
Figure 3:
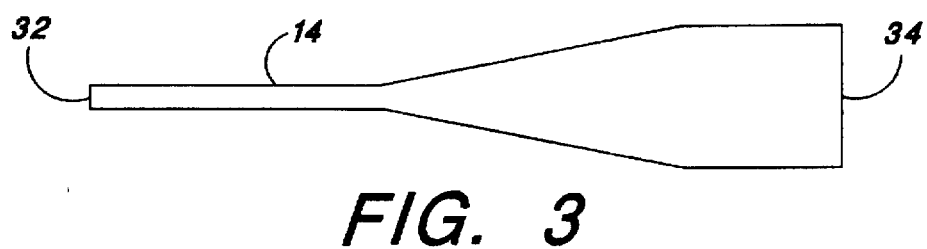
FIG. 3 is an side elevation view of the fiber-optic transformer of FIG. 2.
Figure 4:
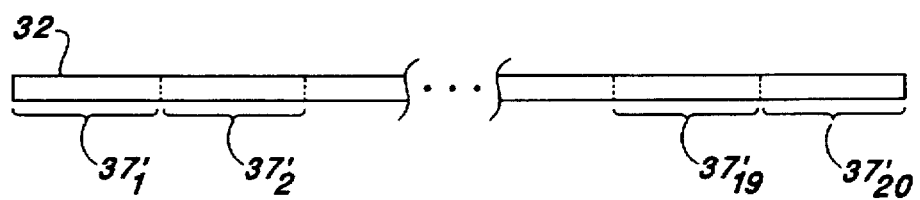
FIG. 4 is a schematic view of the arcuate input surface of the fiber-optic transformer of FIG. 2, in accordance with the present invention.
Figure 5:
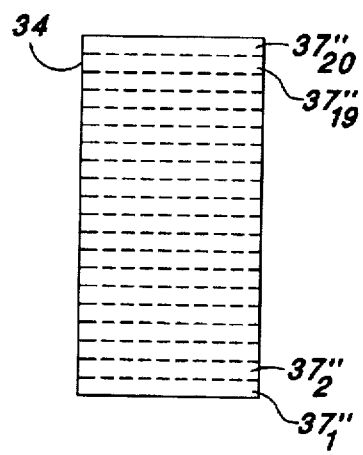
FIG. 5 is a schematic view of the rectangular output surface of the fiber-optic transformer of FIG. 2, in accordance with the present invention.

The fiber-optic transformer 14, shown in FIGS. 2–5, has a curved input surface 32 and a flat rectangular output surface 34. The fiber-optic transformer is located with its input surface aligned along an arc of the perimeter of the circle 25, at a location nearly opposite the location of the grating 22. The transformer consists of a bundle of numerous 15-micron fibers 36 epoxied together at their ends to form a total of twenty (20) light conduits $37_1, 37_2, 37_3 \ldots 37_{20}$. The fibers are loose between the fiber ends. (Note, only one of the twenty light conduits $37_i$ is shown in FIG.2). Each conduit $37_i$ functions as a light pipe between the input surface and the output surface with the input end of the fibers of each conduit being aligned along a different portion $37_i$ of the arc of the optical instrument's image plane 26 (FIG. 4). The curved input surface has a length of about 140 millimeters, a height of approximately 0.65 millimeters, and is placed along the arc to cover a first order spectral range between about 400 nanometers and about 900 nanometers. The curved or arcuate input surface is divided into twenty segments which correspond to the twenty conduits. Each segment has a length of about 7 millimeters, a height of about 0.65 millimeters, and covers about 25 nanometers of the spectral range. The output ends 34 of the fibers in each segment are routed to a corresponding stacked segment of the rectangular output surface to yield a stacked rectangular configuration of segments (FIG. 5).

In manufacture, the twenty conduits 37, at their input end, are sandwiched between two plates of glass and, at the conduit's output end, are inserted into a brass collar. The input tips of the fiber-optic conduits are staggered in position before they are clamped between two glass plates. An arc, with the radius of the Rowland circle, is ground and polished into the face 32 of the clamped conduits. The output ends of the stacked conduits are cemented together and ground flat to form the rectangular output surface 34. The stacked rectangular output surface has a width of 6.7 millimeters and height of 13 millimeters. The length of the fiber optic transformer is about 150 mm. The relatively small length is made possible by use of conduits with loose fibers between the end tips.

Within each segment, $37_i$ the relative position of each fiber is preserved so that light incident on a location in one segment of the curved input surface 32 is emitted from the output surface 34 at a corresponding location of the respective segment $37"_i$.

The first $37'_1$ segment of the input surface FIG. 4, is associated with the bottom segment $37"_i$ of the output surface (FIG. 5) and corresponds to blue-violet light in the spectral range between about 400 nanometers and 425 nanometers. Similarly, the twentieth segment $37'_{20}$ of the input surface is associated with the top segment $37"_{20}$ of the output surface and corresponds to infrared light in the spectral range between about 875 nanometers and 900 nanometers. The wavelength associated with each segment of the output surface increases with increasing height. Note that the fiber-optic transformer readily could have been configured with the conduits stacked in reverse order. The horizontal dotted lines (FIG. 5) that separate each of the conduits indicate where the conduits are cemented together. Alternatively, the transformer can be fabricated of thermally-bent, fused-glass conduits.

The transformer 14 generally transmits light of wavelengths greater than 380 nanometers. Sensitivity to shorter wavelengths is afforded by application of a phosphor, such as sodium salicylate, to either side of a transparent mask of photographic film. Since the gelatin substrate of 16 millimeter film transmits light as short as 200 nanometers, better results are obtained if the phosphor is deposited on the transformer side of the film. However, abrasion of the phosphor surface is more easily avoided if the phosphor is deposited on the side of the film opposite the transformer. The fluorescent light from the phosphor is readily transmitted by the transformer and detected by a camera with a fiber-optic glass window. Sensitivity below 200 nanometers is possible by sealing the instrument and purging it with a dry gas.

The electro-optical sensor 16 (FIG. 1) is a two-dimensional charge-coupled device (CCD) camera with a Peltier-cooled CCD sensor 38 operated in frame transfer mode, available from Wright Instruments Limited of Enfield, Middx., England. The camera has a nearly unity optical transfer function provided by a lens pair 40 and 42. The lens pair is capable of 20% magnification or demagnification. An optical filter 44 may be placed in the collimated beam between the lenses.

Alternatively, the CCD sensor 38 may be fiber-optically coupled to the output surface 34. Further, an intensifier may be placed between the CCD sensor and the output surface. Also, a custom detector, having sensitive regions of predetermined size and location, may be used in place of the CCD sensor.

The image area of the CCD sensor 38 consists of an array of 298 by 576 pixels, each pixel being 22.5 microns square. Vertical binning may be employed to sum signals from 24 parallel video scan lines spanned by a single spectral band or track, and vertical skipping would then be employed to ignore signal from the five scan lines affected by the cement between the tracks.

With the 25 millimeter spectral band of each segment 37'$_i$ spread over the 298 horizontal pixel width of the CCD sensor array, the entire 500 nanometer spectral band, covered by the twenty segments, is spread over nearly 6,000 horizontal pixels. Accordingly, each horizontal pixel is associated with wavelength increments of less than 0.1 nanometers. Assuming that two pixels are necessary to resolve a spectral line, the resulting spectral resolution can be, with accurate focusing and alignment of the optical elements, better than 0.2 nanometers. Further, the spectral line-width resolution is roughly constant throughout the entire 500 nanometer spectral range of the instrument.

A readout time of 50 milliseconds can be achieved using interface electronics, also available from Wright Instruments, and a 100 MHZ Pentium personal computer. The readout time for all twenty segments is limited by the detector interface electronics and the control computer. For bright features, a much shorter integration time can be achieved by reading out only one or two segments. The hardware limited readout time for only two segments is about 5 milliseconds.

Figure 8:
FIG. 8 is an elevation view of a photographic mask, for increasing the dynamic range of the spectrometer of FIG. 1.

Bleeding of a spectral line image along the column direction of the CCD sensor 38 occurs when the signal produced by a very bright spectral line saturates the charge storage capacity of the individual pixels. A photographic mask 46 (FIG.8), having darkened lines 48, inserted in front of the fiber-optic transformer 14 permits the selective attenuation of bright lines, thus avoiding crosstalk between tracks due to saturation, and effectively increasing the CCD sensor's dynamic range.

Figure 6:
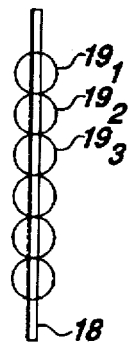
FIG. 6 is an elevation view of an entrance slit of the spectrometer of FIG. 1, having a plurality of light sources that are vertically aligned along the entrance slit.
Figure 7:
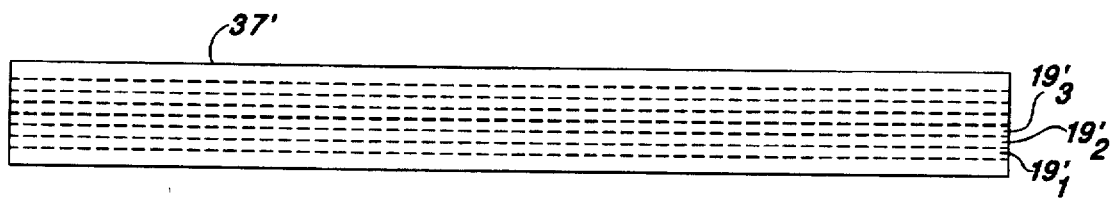
FIG. 7 is a schematic view of one segment of the rectangular output surface shown in FIG. 5, having a plurality of horizonal regions associated with the plurality of light sources shown in FIG. 6.

The stigmatic properties of holographic diffraction grating and the position preserving feature of the optical fibers, allows different sources $19_1, 19_2, \ldots 19_n$ to be stacked in a vertical direction at the input slit 18, as shown FIG. 6. Thus, shown in FIG. 7, the resulting spectra for each source will likewise be stacked in n bands $19'_1, 19'_2, \ldots 19'_n$ within the 0.65 millimeter height of the segments 37'$_i$, so that each segment has horizontal bands that correspond to the spectrum of one of the stacked sources. Accordingly, the spectra of several sources may advantageously be simultaneously monitored without moving parts.

Because the spectrometer 10 is stigmatic over the full 10 millimeter height of the entrance slit, the thickness of the transformer input surface can be made as great as 10 millimeters. Of course, the number of fibers arrayed in the vertical direction would be greatly increased. Further, the transformer's input surface, would also need to be curved in the verticle direction for good focus across the full height of the input surface.

While the invention herein disclosed has been described by means of specific embodiments and applications thereof, numerous modifications and variations could be made thereto by those skilled in the art without departing from the scope of the invention set forth in the claims.

What is claimed is:

1. Apparatus for providing an electrical signal representing an optical signal's spectral components, comprising:

an optical instrument that spectrally disperses the optical signal, substantially in a dispersion plane, such that the signal's spectral components are projected onto a circularly curved image plane oriented perpendicular to the dispersion plane and the spectral components are imaged along an arc of a curved image plane, the arc generally lying in the dispersion plane;

an optical transformer having an arcuate input surface aligned with the arc and having a substantially flat rectangular output surface, wherein the transformer divides the input surface into a plurality of discrete segments along the arc and optically transforms the segments into a stacked format to form a rectangular image area of stacked segments; and an electro-optical sensor, responsive to light that is simultaneously emitted from each segment of the rectangular image area, wherein the sensor provides an electrical signal that represents the intensity and position of light emitted from the rectangular image area of stacked segments.

2. Apparatus for providing a spectral measurement as defined in claim 1, wherein:

the arcuate input surface has a height of about 0.65 millimeters and a length of about 140 millimeters; and the rectangular image area of stacked segments has a height of about 13 millimeters and width of about 6.7 millimeters.

3. Apparatus for providing a spectral measurement as defined in claim 2, wherein:

the length of the arcuate input surface is divided into 20 substantially equal segments;

the top 0.65 millimeters of the rectangular image area correspond to the segment at one end of the arcuate input surface;

the bottom 0.65 millimeters of the rectangular image area correspond to the segment at the other end of the arcuate input surface.

4. Apparatus for providing spectral measurements as defined in claim 1, wherein the optical transformer comprises a plurality of light conduits, each associated with one of the discrete segments.

5. Apparatus for providing spectral measurements as defined in claim 4, wherein each conduit comprises a plurality of optical fibers epoxied together at their ends and oriented such that the relative position of light incident an the input surface, within a segment, is preserved when that light is emitted from the corresponding segment of the output surface.

6. Apparatus for providing spectral measurements as defined in claim 1, wherein the optical instrument includes an aberration-corrected holographic diffraction grating that provides, in the curved image plane, a resolution of at least 0.1 nanometers over a wavelength range of about 500 nanometers.

7. Apparatus for providing spectral measurements as defined in claim 6, wherein the wavelength range extends from about 400 nanometers to about 900 nanometers.

8. Apparatus for providing spectral measurements as defined in claim 7, wherein:

the arc of the curved image plane has a length of about 140 millimeters;

the arcuate input surface of the optical transformer has 20 discrete segments, each segment corresponding to a wavelength range of about 25 nanometers;

the rectangular image area of stacked segments has a height of about 13 millimeters and a width of about 6.7 millimeters.

9. Apparatus for providing spectral measurements as defined in claim 1, further comprising a phosphor mask that is located in the curved image plane between the optical instrument and the arcuate input surface, wherein light having a wavelength less than 380 nanometers causes the phosphor fluoresce allowing sensitivity to light having a wavelength shorter that 380 nanometers.

10. Apparatus for providing spectral measurements as defined in claim 9, wherein the optical instrument and the optical transformer are sealed and purged with a dry gas allowing sensitivity to light having a wavelength below 200 nanometers with a resolution of at least 0.2 nanometers.

11. Apparatus for providing spectral measurements as defined in claim 1, wherein:

the optical instrument includes an entrance slit that has a height of about 10 millimeters and a width that is adjustable between 10 microns and 1 millimeter and a grating that has a diameter of about 7 centimeters and a radius of curvature of about 25 centimeters;

the image plane is located about 12.7 centimeters from the grating, has a width in the dispersion plane of about 140 millimeters, has a height in a vertical direction perpendicular to the dispersion plane of about 10 millimeters, and is curved in the vertical direction across the full height of the image plane for good focus; and the optical instrument further includes a mask that is located in front of the grating and that has an opening with a height of about 40 millimeters and a width of about 7 centimeters, the width lying substantially in the dispersion plane such that the optical instrument provides, in the image plane, a spectral resolution of at least 0.1 nanometers and a vertical resolution of about 0.1 millimeters.

12. Apparatus for providing spectral measurements as defined in claim 1, wherein:

the optical instrument further comprises a turret having first, second and third gratings of differing grating densities; and one of the gratings is selected by rotating the turret until the selected grating is positioned for spectrally imaging the optical signal.

13. Apparatus for providing spectral measurements as defined in claim 12, wherein:

the grating density of the first grating is approximately 1200 lines per millimeter;

the grating density of the second grating is approximately 1800 lines per millimeter; and the grating density of the third grating is approximately 2400 lines per millimeter.

14. Apparatus for providing spectral measurements as defined in claim 1, further comprising a mask having darkened lines, wherein the mask is located in the curved image plane adjacent to the arcuate input surface for selectively attenuating predetermined spectral components.

15. Apparatus for providing spectral measurements as defined in claim 1, wherein:

the flat rectangular output surface has a height of 13 millimeters and a width of 6.7 millimeters; and the electro-optical sensor is a charge-coupled device array of 298 pixels by 576 pixels, each pixel being about 22 microns by 22 microns square for collecting light emitted from the flat rectangular output surface.

16. A spectrometer for providing a spectral scan of an optical signal, comprising:

an entrance slit;

a diffraction grating that resolves the optical signal onto an arc of a circle;

an optical transformer that takes the resolved light incident on discrete segments of the arc and spatially redistributes it so that the resolved light emitted by the transformer is in a stacked rectangular format; and an electro-optical sensor, responsive to the light emitted by the transformer, that provides an electrical signal that represents the intensity and position of the light emitted from the transformer.

17. a spectrometer as defined in claim 16, wherein:

the arc has a chord length of 140 millimeters, a width of 650 micrometers; and the transformer emits the spatially transformed light from within an area having a width of about 7 millimeters and a height of about 13 millimeters.

18. Apparatus for providing spectral measurements as defined in claim 16, wherein the diffraction grating is an aberration-corrected holographic diffraction grating that provides, along the arc of the circle, a resolution of at least 0.1 nanometers over a wavelength range that extends from about 400 nanometers to about 900 nanometers.

19. A spectrometer as defined in claim 16, further comprising a phosphor mask that is located along the arc of the circle adjacent the optical transformer, wherein light having a wavelength less than 380 nanometers causes the phosphor to fluoresce and emit visible light, a portion of which is incident on the discrete segments of the transformer thus extending the spectrometer's sensitivity to include light having a wavelength shorter that 380 nanometers.

20. A spectrometer for providing a spectral scan of an optical signal, comprising:

an entrance slit;

a diffraction grating having a diameter of about 7 centimeters and a radius of curvature of about 25 centimeters, wherein the grating spectrally disperses the optical signal that passes through the entrance slit onto an curved image plane with the dispersed optical signal being imaged along an arc of the image plane that has a height of about 0.65 millimeters and a length of 140 millimeters such that the wavelength corresponding to the optical signal imaged at one end of the arc is approximately 400 nanometers and the wavelength corresponding to the optical signal imaged at another end of the arc is 900 nanometers and the spectral resolution along the arc is about 0.1 nanometers; and an optical transformer having an arcuate input surface aligned with the arc of the image plane and having a substantially flat rectangular output surface, wherein the transformer's input surface is divided along the arc into a plurality of discrete segments and the transformer optically transforms the segments that lie along the arc into a stack of segments that form a rectangular image area having a height of about 13 millimeters and a width of about 6.7 millimeters;

wherein the arcuate input surface of the optical transformer, the slit, and the grating lie along the circumference of a Rowland circle having a diameter of about 12.7 centimeters.

* * * * *

UNITED STATES PATENT AND TRADEMARK OFFICE
CERTIFICATE OF CORRECTION

PATENT NO. : 5,675,411
DATED : 10/7/97
INVENTOR(S) : Brooks, et al.

It is certified that error appears in the above-identified patent and that said Letters Patent is hereby corrected as shown below:

IN THE CLAIMS:

In column 6, claim 5, line 53, change "an" to --on--.

In column 7, claim 9, line 13, insert --to-- after "phosphor".

In column 7, claim 9, line 14, change "that" to --than--.

Signed and Sealed this

Twenty-first Day of April, 1998

Attest:

BRUCE LEHMAN

Attesting Officer

Commissioner of Patents and Trademarks